(12) United States Patent
Wang et al.

(10) Patent No.: US 11,960,430 B2
(45) Date of Patent: Apr. 16, 2024

(54) REMOTE MAPPING METHOD, APPARATUS AND DEVICE FOR COMPUTING RESOURCES, AND STORAGE MEDIUM

(71) Applicant: INSPUR (BEIJING) ELECTRONIC INFORMATION INDUSTRY CO., LTD., Beijing (CN)

(72) Inventors: Yanwei Wang, Beijing (CN); Rengang Li, Beijing (CN); Hongwei Kan, Beijing (CN)

(73) Assignee: INSPUR (BEIJING) ELECTRONIC INFORMATION INDUSTRY CO., LTD., Beijing (CN)

( * ) Notice: Subject to any disclaimer, the term of this patent is extended or adjusted under 35 U.S.C. 154(b) by 0 days.

(21) Appl. No.: 18/246,817

(22) PCT Filed: Apr. 26, 2021

(86) PCT No.: PCT/CN2021/089931
§ 371 (c)(1),
(2) Date: Mar. 27, 2023

(87) PCT Pub. No.: WO2022/095348
PCT Pub. Date: May 12, 2022

(65) Prior Publication Data
US 2024/0045824 A1 Feb. 8, 2024

(30) Foreign Application Priority Data

Nov. 6, 2020 (CN) .......................... 202011229875.0

(51) Int. Cl.
G06F 13/14 (2006.01)
G06F 13/40 (2006.01)
(Continued)

(52) U.S. Cl.
CPC ........ *G06F 13/404* (2013.01); *G06F 13/4282* (2013.01); *G06F 15/7825* (2013.01)

(58) Field of Classification Search
None
See application file for complete search history.

(56) References Cited

U.S. PATENT DOCUMENTS

2013/0258358 A1* 10/2013 Qian .................. G06K 15/1894
358/1.8
2022/0291961 A1* 9/2022 Saha ......................... G06F 9/50
2022/0413918 A1* 12/2022 Ren ....................... G06F 9/5072

FOREIGN PATENT DOCUMENTS

CN 108776648 A 11/2018
CN 109783429 A 5/2019
(Continued)

OTHER PUBLICATIONS

International search report for PCT/CN2021/089931 mailed on Jul. 27, 2021.
(Continued)

*Primary Examiner* — Henry Tsai
*Assistant Examiner* — Dean Phan
(74) *Attorney, Agent, or Firm* — Dennemeyer & Associates LLC; Victoria Friedman

(57) ABSTRACT

A remote mapping method, apparatus and device for computing resources, and a storage medium, which are applied to a server. Said method comprises: identifying each FPGA heterogeneous accelerator card in an FPGA BOX; establishing a network communication connection with each FPGA heterogeneous accelerator card via a network interface of each FPGA heterogeneous accelerator card in the FPGA BOX, and establishing a network communication connection between FPGA heterogeneous accelerator cards; mapping each FPGA heterogeneous accelerator card to the server; establishing network transmission for the established
(Continued)

network communication connections, and migrating a control flow and a data flow that are performed by the PCIE to the network transmission; and deploying a target application in the FPGA BOX through the established network transmission, and when running the target application, performing data exchange with the FPGA BOX via the network transmission. By applying the solutions of the present disclosure, the limitation of PCIE slots is broken through, and a transmission path is shortened.

20 Claims, 3 Drawing Sheets

(51) Int. Cl.
*G06F 13/42* (2006.01)
*G06F 15/78* (2006.01)

(56) References Cited

FOREIGN PATENT DOCUMENTS

| CN | 109783433 A | 5/2019 |
| CN | 109787918 A | 5/2019 |
| CN | 109857620 A | 6/2019 |
| CN | 111143276 A | 5/2020 |
| CN | 111262917 A | 6/2020 |
| CN | 111343148 A | 6/2020 |
| CN | 112416840 A | 2/2021 |

OTHER PUBLICATIONS

Search report for Chinese application 202011229875.0, filed Nov. 6, 2020.

* cited by examiner

REMOTE MAPPING METHOD, APPARATUS AND DEVICE FOR COMPUTING RESOURCES, AND STORAGE MEDIUM

CROSS-REFERENCE TO RELATED APPLICATIONS

This is a 35 U.S.C. 371 National Stage Patent Application of International Application No. PCT/CN2021/089931, filed Apr. 26, 2021, which claims priority to Chinese application 202011229875.0, filed Nov. 6, 2020, each of which is hereby incorporated by reference in its entirety.

TECHNICAL FIELD

The present disclosure relates to the technical field of data processing, and in particular, to a remote mapping method, apparatus, and device for computing resources, and a storage medium.

BACKGROUND

Along with the rapid development of artificial intelligence and big data, data in data centers has doubled and redoubled, and demands for computing power of the data centers increase in an exponential manner. However, improvement of computing capability of a Central Processing Unit (CPU) processor starts to lag behind Moore's law, and in the post-Moore era, the performance of the CPU cannot improve in an exponential manner. Due to advantages such as high parallel computing capability, hardware programmability, low power consumption and low latency, etc., Field Programmable Gate Array (FPGA) and Application Specific Integrated Circuit (ASIC) heterogeneous acceleration systems have been applied in fields such as data analysis, network data processing, scientific computing, and so on.

FPGAs have been deployed on a large scale in servers of data centers. Most of deployment modes adopt CPU binding modes of single-machine single-card and single-machine multi-card. Such machine-card binding modes cause tight coupling between servers and FPGA accelerator cards, and the FPGA accelerator cards need to be added. As the number of Peripheral Component Interconnect Express (PCIE) slots of a server is limited, matching servers need to be added.

Some other solutions are to use mechanisms such as remote login to complete the virtualization of a remote FPGA at a local end, but this relies on that a CPU at the local end interacts with a CPU at the remote end by a network via a network card, so that a transmission path is too long and time delay is increased, thereby counteracting the increase of efficiency brought about by FPGA acceleration to some extent. Furthermore, along with the continuous development and evolution of a data center architecture, FPGA accelerators decoupled from a CPU start to be deployed in the data centers, and at this time, FPGAs, as independent acceleration units, are no longer deployed inside the servers by PCIE, rendering that the described virtualization function cannot be effectively realized.

In conclusion, when the FPGA accelerator cards are expanded on a large scale, breaking through the limitation of PCIE slots to more effectively apply FPGAs for acceleration and to shorten a transmission path is a technical problem to be urgently solved by a person skilled in the art.

SUMMARY

Some embodiments of the present disclosure provide the following technical solutions:

a remote mapping method for computing resources, which is applied to a server and includes:
each FPGA heterogeneous accelerator card in an FPGA BOX is identified; wherein the FPGA BOX includes one or more FPGA heterogeneous accelerator cards, and each FPGA heterogeneous accelerator card is decoupled from a CPU and completes configuration of a PCIE interface and mapping of a data transmission function to a network interface;
by means of a network interface of each FPGA heterogeneous accelerator card in the FPGA BOX, establishing a network communication connection with each FPGA heterogeneous accelerator card, and a network communication connection is established between FPGA heterogeneous accelerator cards;
each FPGA heterogeneous accelerator card is mapped to the server;
network transmission is established for the established network communication connections, and migrating a control flow and a data flow that are transmitted by a PCIE interface to the network transmission; and
a target application is deployed in the FPGA BOX by means of the established network transmission, and data exchange is performed with the FPGA BOX by means of the established network transmission during running of the target application.

In some embodiments, identifying each FPGA heterogeneous accelerator card in an FPGA BOX includes:
on the basis of interaction between a resource management module and the server, allocated information of each FPGA heterogeneous accelerator card is acquired, and the acquired information of each FPGA heterogeneous accelerator card is stored in an encryption configuration file of the server; and
the encryption configuration file of the server is queried and decrypted, to complete identification of each FPGA heterogeneous accelerator card in the FPGA BOX.

In some embodiments, mapping each FPGA heterogeneous accelerator card to the server includes:
a virtual ID to each FPGA heterogeneous accelerator card is allocated according to an identified physical ID of each FPGA heterogeneous accelerator card in the FPGA BOX;
a mapping relationship is established between physical IDs and corresponding virtual IDs, and a device node is locally created in the server according to the virtual ID; wherein each device node corresponds to an FPGA; and
a mapping relationship between virtual IDs of device nodes and corresponding network address information is established to complete mapping of each FPGA heterogeneous accelerator card to the server.

In some embodiments, the method further includes:
PCIE bus simulation is performed on the basis of a virtual device driver, converting a Base Address Register (BAR) address operation of virtual PCIE to an Ethernet data packet operation, and completing register operations, DMA data flow operations and data reception interruption which are performed by an upper-layer application.

In some embodiments, the method further includes:
after completing calculation of the target application by using each FPGA heterogeneous accelerator card in the FPGA BOX, a message representing that the calculation is completed is received; and a virtual interruption signal is sent to the upper-layer application.

In some embodiments, the network interface of each FPGA heterogeneous accelerator card in the FPGA BOX is a network interface based on an optical module.

In some embodiments, establishing network transmission for the established network communication connections, and migrating a control flow and a data flow that are transmitted by the PCIE interface to the network transmission includes:

by means of a high-speed interconnection mechanism, reliable network transmission for the established network communication connections is established, and a control flow and a data flow that are transmitted by the PCIE interface are migrated to the reliable network transmission.

In some embodiments, the method further includes:

address restriction data carrying multiple pieces of network address information is sent to each preset FPGA heterogeneous accelerator card, so that each FPGA heterogeneous accelerator card receiving the address restriction data only allows communication with a device of which network address information complies with definition of the address restriction data;

wherein the address restriction data at least includes network address information of the server.

A remote mapping apparatus for computing resources, which is applied to a server and includes:

an FPGA heterogeneous accelerator card identification unit, configured to identify each FPGA heterogeneous accelerator card in an FPGA BOX; wherein the FPGA BOX includes one or more FPGA heterogeneous accelerator cards, and each FPGA heterogeneous accelerator card is decoupled from a CPU and completes configuration of a PCIE interface and mapping of a data transmission function to a network interface;

a network communication connection establishing unit, configured to by means of a network interface of each FPGA heterogeneous accelerator card in the FPGA BOX, establish a network communication connection with each FPGA heterogeneous accelerator card, and establish a network communication connection between FPGA heterogeneous accelerator cards;

a local mapping unit, configured to map each FPGA heterogeneous accelerator card to the server;

a network transmission establishing unit, configured to establish network transmission for the established network communication connections, and migrate a control flow and a data flow that are transmitted by the PCIE interface to the network transmission; and a target application deployment and running unit, configured to deploy a target application in the FPGA BOX by means of the established network transmission, and perform data exchange with the FPGA BOX by means of the established network transmission during running of the target application.

A remote mapping device for computing resources, comprising:

a memory for storing a computer program; and a processor for executing the computer program to implement the steps of the remote mapping method for computing resources according to any one above.

A computer-readable storage medium, wherein the computer-readable storage medium stores a computer program, and when the computer program is executed by a processor, the steps of the remote mapping method for computing resources according to any one above are implemented.

BRIEF DESCRIPTION OF THE DRAWINGS

In order to describe the technical solutions in the embodiments of the present disclosure or in the related art more clearly, hereinafter, accompanying drawings requiring to be used to describe the embodiments or the related art are introduced briefly. Apparently, the accompanying drawings in the following description merely relate to some embodiments of the present disclosure, and for a person of ordinary skill in the art, other accompanying drawings can also be derived from these accompanying drawings without involving any inventive effort.

DETAILED DESCRIPTION OF THE EMBODIMENTS

The core of some embodiments of the present disclosure is to provide a remote mapping method for computing resources, which can avoid limitation of PCIE slots and shorten a transmission path, thereby also facilitating improvement of the execution efficiency of an application.

To make a person skilled in the art better understand the solutions of some embodiments of the present disclosure, hereinafter, some embodiments of the present disclosure are further described in detail with reference to the accompanying drawings and specific embodiments. Obviously, the embodiments as described are only parts of embodiments rather than all embodiments of the present disclosure. All other embodiments obtained by a person of ordinary skill in the art on the basis of the embodiments of the present disclosure without any inventive effort shall all fall within the scope of protection of the present disclosure.

Figure 1:
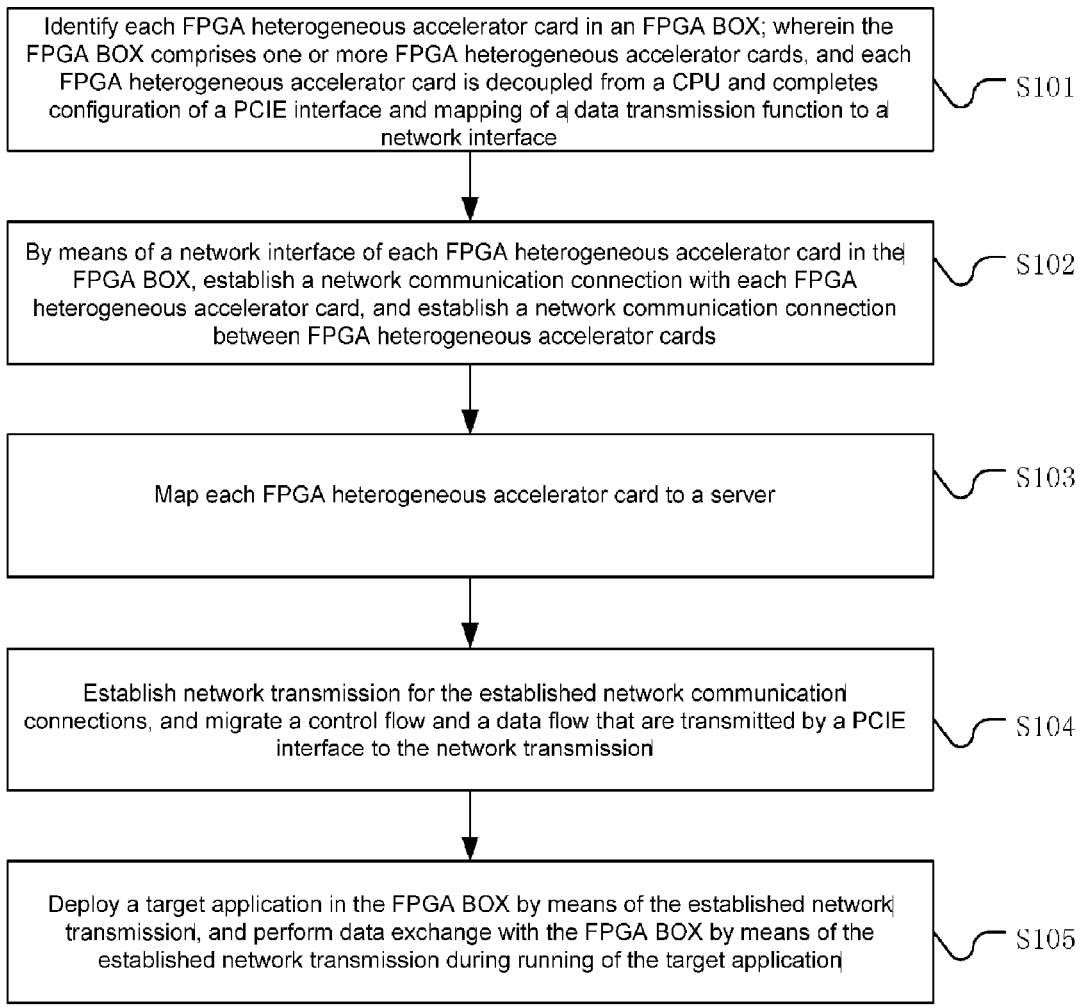
FIG. 1 is an implementation flowchart of a remote mapping method for computing resources according to some embodiments of the present disclosure.

Please refer to FIG. 1, FIG. 1 is an implementation flowchart of a remote mapping method for computing resources according to some embodiments of the present disclosure. The remote mapping method for computing resources can be applied to a server, and includes the following steps:

step S101: each FPGA heterogeneous accelerator card in an FPGA BOX is identified; wherein the FPGA BOX includes one or more FPGA heterogeneous accelerator cards, and each FPGA heterogeneous accelerator card is decoupled from a CPU and completes configuration of a PCIE interface and mapping of a data transmission function to a network interface.

After each FPGA heterogeneous accelerator card in the FPGA BOX is powered on, the server can perform device discovery on each FPGA heterogeneous accelerator card in a remote FPGA BOX, that is, identify each FPGA heterogeneous accelerator card in the FPGA BOX, thereby obtaining device information of each FPGA heterogeneous accelerator card. Specific content items of the device information may generally comprise an IP address, a Media Access Control Address (MAC) address, a board card PCIE bus parameter, a physical ID, etc.

The FPGA BOX described in some embodiments of the present disclosure is a data center architecture centered on FPGA heterogeneous accelerator cards, completes decoupling of FPGA computing resources from a CPU, and performs reconstruction, thereby realizing pooling of the FPGA computing resources. The FPGA BOX includes one or more FPGA heterogeneous accelerator cards, and the specific number thereof can be set according to actual needs.

It should be noted that all FPGA heterogeneous accelerator cards being decoupled from a CPU means that all the FPGA heterogeneous accelerator cards can work without depending on the CPU, that is, the FPGA BOX may not comprise a CPU or other switching chips, and may also comprise a CPU and process work in some other aspects by using the CPU, and the CPU does not need to participate in the solutions of some embodiments of the present disclosure. In addition, for each FPGA heterogeneous accelerator card, it is necessary that the FPGA heterogeneous accelerator card completes configuration of a PCIE interface and mapping of a data transmission function to a network interface, so that a subsequent server can perform data transmission by using the network interface of the FPGA heterogeneous accelerator card, and the FPGA heterogeneous accelerator card can also be configured.

In order to facilitate implementation, the FPGA BOX is compatible with full-height and half-height FPGA heterogeneous accelerator cards, and the height thereof may generally be equal to the height of a standard 3U device. In actual applications, 16 single-width or 32 double-width FPGA heterogeneous accelerator cards may be generally deployed by PCIE, wherein in a front panel, 8 double-width or 16 single-width FPGA heterogeneous accelerator cards can be deployed by PCIE, and in a rear panel, 8 double-width or 16 single-width FPGA heterogeneous accelerator cards may also be deployed by PCIE.

A PCIE slot is only used for power supply, and it is not necessary to achieve work of FPGA heterogeneous accelerator cards by accessing PCIE by using a CPU as that in conventional solutions. That is, in the solutions of some embodiments of the present disclosure, a control path and a data path of each FPGA heterogeneous accelerator card in the FPGA BOX do not perform transmission via PCIE and CPU, but perform transmission directly on the basis of a network interface of the FPGA heterogeneous accelerator card. In addition, a hardware path for monitoring management can be reserved.

Step S102: by means of a network interface of each FPGA heterogeneous accelerator card in the FPGA BOX, establishing a network communication connection with each FPGA heterogeneous accelerator card, and a network communication connection is established between FPGA heterogeneous accelerator cards.

Step S103: each FPGA heterogeneous accelerator card is mapped to the server.

Step S104: network transmission is established for the established network communication connections, and migrating a control flow and a data flow that are transmitted by a PCIE interface to the network transmission.

By means of step S102, step S103 and step S104, a communication connection between the server and each FPGA heterogeneous accelerator card in the FPGA BOX can be achieved. Subsequently, the deployment and running of a target application can be achieved, and none of these processes requires participation of a CPU in the FPGA BOX.

In some embodiments, after step S102 is executed, by means of a network interface of each FPGA heterogeneous accelerator card in the FPGA BOX, a network communication connection with each FPGA heterogeneous accelerator card is established, and a network communication connection between FPGA heterogeneous accelerator cards is established; that is to say, this step achieves a network path for data transmission. For example, during specific implementation, a network communication connection between a switch, the server and each FPGA heterogeneous accelerator card can be established on the basis of a network interface of each FPGA heterogeneous accelerator card in the FPGA BOX, so that network communication connections are established both between the server and each FPGA heterogeneous accelerator card and between FPGA heterogeneous accelerator cards.

Then, each FPGA heterogeneous accelerator card is mapped to the server, that is, each FPGA heterogeneous accelerator card is virtualized into the server, so that each FPGA heterogeneous accelerator card in the FPGA BOX can be seen on the server. During use, there is no difference between the server using a local FPGA heterogeneous accelerator card and the server using each FPGA heterogeneous accelerator card in the FPGA BOX. It is also necessary to establish network transmission for the established network communication connections, and to migrate a control flow and a data flow that are transmitted by the PCIE interface to the network transmission. In some embodiments, interaction content between the server and the FPGA heterogeneous accelerator cards can be divided into a control instruction and data migration, that is, a control flow and a data flow, and the control flow and data flow that are transmitted by the PCIE interface in conventional solutions need to be migrated to the network transmission established in step S104. When network transmission is established for the established network communication connections, the specifically adopted network transmission mechanism can be set and adjusted according to actual needs. For example, in specific embodiments of the present disclosure, this step may be specifically: by means of a high-speed interconnection mechanism, establishing reliable network transmission for the established network communication connections, and migrating a control flow and a data flow that are transmitted by the PCIE interface to the reliable network transmission. The reliable network transmission is established by means of the high-speed interconnection mechanism, thereby improving the efficiency and reliability of data transmission. Of course, the specific content of the high-speed interconnection mechanism can be selected according to actual needs.

In some embodiments of the present disclosure, step S103 may comprise:
   a virtual ID to each FPGA heterogeneous accelerator card is allocated according to an identified physical ID of each FPGA heterogeneous accelerator card in the FPGA BOX;
   a mapping relationship is established between physical IDs and corresponding virtual IDs, and a device node is locally created in the server according to the virtual ID; wherein each device node corresponds to an FPGA; and
   a mapping relationship between virtual IDs of device nodes and corresponding network address information is established to complete mapping of each FPGA heterogeneous accelerator card to the server.

In this embodiment, usually, each FPGA heterogeneous accelerator card can be mapped to the server on the basis of a virtual device driver.

In some embodiments, the server can identify each FPGA heterogeneous accelerator card in the FPGA BOX, for example, each FPGA heterogeneous accelerator card in the FPGA BOX can be identified on the basis of a resource management module, so that device information of each FPGA heterogeneous accelerator card can be obtained, for example, the device information can comprise the number of FPGA heterogeneous accelerator cards in the FPGA BOX, and a physical ID and an IP address of each FPGA heterogeneous accelerator card, etc.

According to the identified physical ID of each FPGA heterogeneous accelerator card in the FPGA BOX, the server may allocate a virtual ID to each FPGA heterogeneous accelerator card, so as to establish a mapping relationship between physical IDs and corresponding virtual IDs; and according to a local set directory of each virtual ID in the server, for example, under/dev/, each device node is created. Each device node has a corresponding virtual ID, that is, each device node corresponds to one FPGA heterogeneous accelerator card.

After establishing a mapping relationship between virtual IDs of device nodes and corresponding network address information, mapping of each FPGA heterogeneous accelerator card to the server can be completed; and the network address information can generally comprise an IP address and a MAC address of the FPGA heterogeneous accelerator card, as long as communication with the FPGA heterogeneous accelerator card can be achieved on the basis of the network address information.

Completing mapping of each FPGA heterogeneous accelerator card to the server on the basis of a virtual device driver is in consideration that a target application is usually created by using an OpenCL programming framework; the virtual device driver is generally created according to a standard conforming to the OpenCL programming framework; and then mapping of each FPGA heterogeneous accelerator card to the server can be completed on the basis of the created virtual device driver.

In addition, in specific embodiments of the present disclosure, the method can further comprise:

PCIE bus simulation is performed on the basis of a virtual device driver, converting a Base Address Register (BAR) address operation of virtual PCIE to an Ethernet data packet operation, and completing register operations, DMA data flow operations and data reception interruption which are performed by an upper-layer application, so that the target application can achieve non-perception operation of an upper-layer. In some embodiments, a non-perception operation can be provided for upper-layer OpenCL of the server, thereby facilitating improvement of user experience. Conversion from a BAR address operation of virtualized PCIE to an Ethernet data packet operation is achieved in a virtual drive layer, and this conversion may achieve compatibility of all register operations, all DMA data flow operations, and all interruption of data reception of the OpenCL; and an upper-layer OpenCL application is unaware of whether the FPGA heterogeneous accelerator card is mapped via a network, that is, non-perception operation is achieved. There is no difference between a user using a local FPGA heterogeneous accelerator card and using an FPGA heterogeneous accelerator card in the FPGA BOX.

The specific form of the network interface of each FPGA heterogeneous accelerator card in the FPGA BOX can also be set according to actual needs. In specific embodiments of the present disclosure, the network interface of each FPGA heterogeneous accelerator card in the FPGA BOX is a network interface based on an optical module, facilitating improvement of data transmission efficiency.

In addition, it should be noted that, in some of the embodiments above, the virtual device driver is used to achieve communication between the server and each FPGA heterogeneous accelerator card. In other embodiments, communication may also be achieved not on the basis of the virtual device driver, that is, on the basis of the network interface of each FPGA heterogeneous accelerator card in the FPGA BOX, the communication between the server and each FPGA heterogeneous accelerator card and the communication between FPGA heterogeneous accelerator cards can be achieved. For example, when an RTL programming framework is used to create a target application, each FPGA heterogeneous accelerator card can be directly mapped to the server, and reliable network transmission is established by a high-speed interconnection mechanism.

Step S105: a target application is deployed in the FPGA BOX by means of the established network transmission, and data exchange is performed with the FPGA BOX by means of the established network transmission during running of the target application.

By means of steps S102 to S104, each FPGA heterogeneous accelerator card in the FPGA BOX can be virtualized to a server locally, and thus the target application can be deployed in the FPGA BOX via the network transmission established between the server and each FPGA heterogeneous accelerator card. The target application may be artificial intelligence, image processing, data compression, etc. The target application is deployed in the FPGA BOX, and the number of specifically used FPGA heterogeneous accelerator cards in the FPGA BOX can be set and adjusted according to actual needs of the target application.

After the target application is deployed, when the target application is running, the server can perform data exchange with the FPGA BOX via the network transmission established previously, that is, perform data exchange with each FPGA heterogeneous accelerator card in the FPGA BOX through a network interface of each FPGA heterogeneous accelerator card.

The server performs data exchange with the FPGA BOX, and the data can generally be divided into two types of interaction data, in which a first type is a control instruction type, for modifying configuration of a register in the FPGA BOX, so that the deployment and adjustment of the target application can be achieved; and a second type is a data type, which may specifically comprise reading, writing, and interruption, etc. of data.

For example, in specific embodiments of the present disclosure, for writing operation of a register or DMA in an FPGA, a virtual ID, corresponding to the FPGA heterogeneous accelerator card, of the current environment of the server can be acquired first; and then according to an IP address of the FPGA heterogeneous accelerator card, a protocol packaging operation is performed according to a development interface of the high-speed interconnection mechanism, for example, the packaging may be performed on the basis of a UDP, and next, data can be sent to a remote FPGA heterogeneous accelerator card by an optical module to complete a writing operation.

For a reading operation, the server can detect an Ethernet receiving data packet, and perform UDP unpacking operation according to a high-speed interconnection mechanism protocol to complete data receiving. For interruption processing, the FPGA heterogeneous accelerator card will actively send a feature packet, and after parsing the packet as a feature packet, the server can transmit same to an upper-layer OpenCL/RTL development framework by a signal mechanism. Certainly, if it is an OpenCL development framework, simulation of a PCIE bus may also be performed.

In addition, it should be noted that, in the described embodiments of the present disclosure, it is described that a remote FPGA heterogeneous accelerator card is virtualized to a server locally, that is, each FPGA heterogeneous accelerator card in the FPGA BOX is virtualized to the server locally; and the server in some embodiments of the present disclosure can be simultaneously compatible with FPGA heterogeneous accelerator cards of the server locally, that is, in terms of use, there is no difference between a remote FPGA heterogeneous accelerator card and a local FPGA heterogeneous accelerator card, facilitating improvement of user experience. Furthermore, during development, the same development mode may also be employed.

In specific embodiments of the present disclosure, identifying each FPGA heterogeneous accelerator card in an FPGA BOX described in step S101 may specifically comprise:
  on the basis of interaction between a resource management module and the server, acquiring allocated information of each FPGA heterogeneous accelerator card, and storing the acquired information of each FPGA heterogeneous accelerator card in an encryption configuration file of the server; and
  querying and decrypting the encryption configuration file of the server, to complete identification of each FPGA heterogeneous accelerator card in the FPGA BOX.

In the embodiment, after allocated information of each FPGA heterogeneous accelerator card is acquired, the acquired information of each FPGA heterogeneous accelerator card is stored in the encryption configuration file of the server; and then the encryption configuration file of the server is queried and decrypted, so as to complete identification of each FPGA heterogeneous accelerator card in the FPGA BOX, facilitating improvement of the security of the solution. The specific encryption manner may also be adjusted according to actual needs.

In specific embodiments of the present disclosure, the method can further comprise:
  after completing calculation of the target application by using each FPGA heterogeneous accelerator card in the FPGA BOX, receiving a message representing that the calculation is completed; and sending a virtual interruption signal to the upper-layer application. In this way, the upper-layer application learns the information that calculation of the target application has been completed, and can perform subsequent tasks.

In specific embodiments of the present disclosure, the method can further comprise:
  sending address restriction data carrying multiple pieces of network address information to each preset FPGA heterogeneous accelerator card, so that each FPGA heterogeneous accelerator card receiving the address restriction data only allows communication with a device of which network address information complies with definition of the address restriction data;
  wherein the address restriction data at least includes network address information of the server.

When the network address information is the network address information of the FPGA in the FPGA BOX, the network address information may specifically comprise an IP address, a MAC address, an ID, etc. of the FPGA heterogeneous accelerator card. As each FPGA heterogeneous accelerator card receiving the address restriction data only allows communication with a device of which network address information complies with definition of the address restriction data, that is to say, after restriction by the address restriction data, for any one FPGA heterogeneous accelerator card that receives the address restriction data, the FPGA heterogeneous accelerator card can only respond to a device defined by the address restriction data, and will not respond to none of the other devices, facilitating improvement of data security.

By applying the technical solutions provided in embodiments of the present disclosure, each FPGA heterogeneous accelerator card in the FPGA BOX is virtualized to the server locally, and a control flow and a data flow that are transmitted by the PCIE interface are migrated to network transmission, so that same as using a local FPGA heterogeneous accelerator card, the server can use each FPGA heterogeneous accelerator card in a remote FPGA BOX without distinction. In some embodiments, by means of a network interface of each FPGA heterogeneous accelerator card in the FPGA BOX, establishing a network communication connection with each FPGA heterogeneous accelerator card, and establishing a network communication connection between FPGA heterogeneous accelerator cards; mapping each FPGA heterogeneous accelerator card to the server; and establishing network transmission for the established network communication connections, and migrating a control flow and a data flow that are transmitted by the PCIE interface to the network transmission. Furthermore, in the solutions of some embodiments of the present disclosure, communication is achieved on the basis of a network interface of each FPGA heterogeneous accelerator card, and each FPGA heterogeneous accelerator card is decoupled from a CPU and completes configuration of a PCIE interface and mapping of a data transmission function to the network interface, so that each FPGA heterogeneous accelerator card in the FPGA BOX can work without depending on the CPU. That is, the solutions of some embodiments of the present disclosure shorten a transmission path, also facilitating improvement of the execution efficiency of a target application. Moreover, as communication is achieved by the network interface of each FPGA heterogeneous accelerator card in the FPGA BOX, each FPGA heterogeneous accelerator card is virtualized into the server, so that the solutions of some embodiments of the present disclosure are not limited by PCIE slots of the server. In summary, in the solutions of some embodiments of the present disclosure, when the FPGA accelerator cards are expanded on a large scale, the limitation of PCIE slots is broken through to more effectively apply FPGAs for acceleration and to shorten a transmission path, and shortening of a transmission path also facilitates improvement of the execution efficiency of a target application.

Corresponding to the method embodiments above, embodiments of the present disclosure further provide a remote mapping apparatus for computing resources, and reference can be made to each other.

Figure 2:
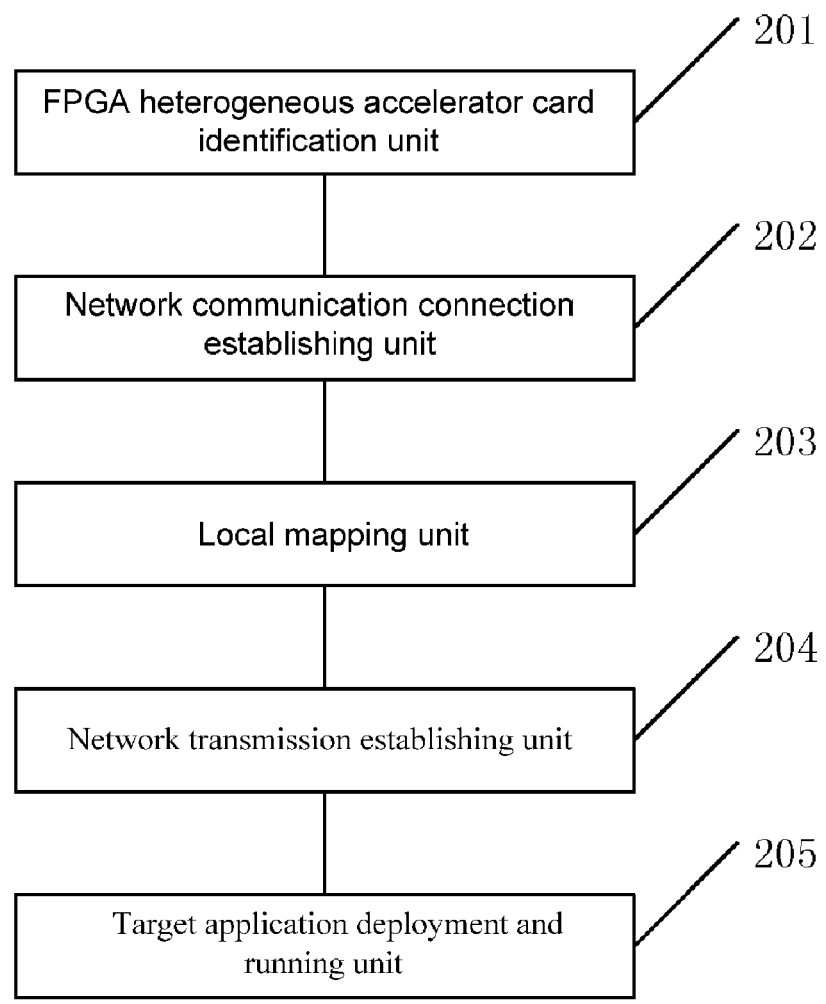
FIG. 2 is a schematic structural diagram of a remote mapping apparatus for computing resources according to some embodiments of the present disclosure.

Referring to FIG. 2, FIG. 2 is a schematic structural diagram of a remote mapping apparatus for computing resources according to some embodiments of the present disclosure. Said apparatus is applied to a server and includes:
  an FPGA heterogeneous accelerator card identification unit 201, configured to identify each FPGA heterogeneous accelerator card in an FPGA BOX; wherein the FPGA BOX includes one or more FPGA heterogeneous accelerator cards, and each FPGA heterogeneous accelerator card is decoupled from a CPU and completes configuration of a PCIE interface and mapping of a data transmission function to a network interface;

a network communication connection establishing unit 202, configured to by means of a network interface of each FPGA heterogeneous accelerator card in the FPGA BOX, establish a network communication connection with each FPGA heterogeneous accelerator card, and establish a network communication connection between FPGA heterogeneous accelerator cards;

a local mapping unit 203, configured to map each FPGA heterogeneous accelerator card to the server;

a network transmission establishing unit 204, configured to establish network transmission for the established network communication connections, and migrate a control flow and a data flow that are transmitted by the PCIE interface to the network transmission; and a target application deployment and running unit 205, configured to deploy a target application in the FPGA BOX by means of the established network transmission, and perform data exchange with the FPGA BOX by means of the established network transmission during running of the target application.

In specific embodiments of present disclosure, the FPGA heterogeneous accelerator card identification unit 201 is specifically configured to:

on the basis of interaction between a resource management module and the server, acquire allocated information of each FPGA heterogeneous accelerator card, and store the acquired information of each FPGA heterogeneous accelerator card in an encryption configuration file of the server; and query and decrypt the encryption configuration file of the server, to complete identification of each FPGA heterogeneous accelerator card in the FPGA BOX.

In specific embodiments of the present disclosure, the local mapping unit 203 is specifically configured to:

allocate a virtual ID to each FPGA heterogeneous accelerator card according to an identified physical ID of each FPGA heterogeneous accelerator card in the FPGA BOX;

establish a mapping relationship between physical IDs and corresponding virtual IDs, and locally create a device node in the server according to the virtual ID; wherein each device node corresponds to an FPGA; and establish a mapping relationship between virtual IDs of device nodes and corresponding network address information, to complete mapping of each FPGA heterogeneous accelerator card to the server.

In specific embodiments of the present disclosure, the apparatus further includes:

a PCIE bus simulation unit, configured to perform PCIE bus simulation on the basis of a virtual device driver, convert a BAR address operation of virtual PCIE to an Ethernet data packet operation, and complete register operations, DMA data flow operations and data reception interruption which are performed by an upper-layer application.

In specific embodiments of the present disclosure, the apparatus further includes:

an interruption signal sending unit, configured to: after completing calculation of the target application by using each FPGA heterogeneous accelerator card in the FPGA BOX, receive a message representing that the calculation is completed; and send a virtual interruption signal to the upper-layer application.

In specific embodiments of the present disclosure, the network interface of each FPGA heterogeneous accelerator card in the FPGA BOX is a network interface based on an optical module.

In specific embodiments of the present disclosure, the network transmission establishing unit 204 is specifically configured to:

by means of a high-speed interconnection mechanism, establish reliable network transmission for the established network communication connections, and migrate a control flow and a data flow that are transmitted by the PCIE interface to the reliable network transmission.

In specific embodiments of the present disclosure, the apparatus further includes:

an address restriction unit, configured to send address restriction data carrying multiple pieces of network address information to each preset FPGA heterogeneous accelerator card, so that each FPGA heterogeneous accelerator card receiving the address restriction data only allows communication with a device of which network address information complies with definition of the address restriction data;

wherein the address restriction data at least includes network address information of the server.

Corresponding to the method and apparatus embodiments above, embodiments of the present disclosure further provide a remote mapping device for computing resources and a computer-readable storage medium. The computer-readable storage medium stores a computer program, and when the computer program is executed by a processor, the steps of the remote mapping method for computing resources in any one of the embodiments above can be implemented, and reference can be made to each other. The computer-readable storage medium as stated herein includes a random access memory (RAM), a memory, a read-only memory (ROM), an electrically programmable ROM, an electrically erasable programmable ROM, a register, a hard disk, a removable disk, a CD-ROM, or storage media in any other forms known in the present technical field.

Figure 3:
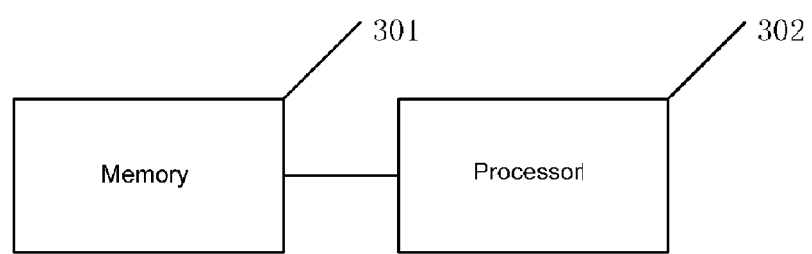
FIG. 3 is a schematic structural diagram of a remote mapping device for computing resources according to some embodiments of the present disclosure.

Referring to FIG. 3, it is a schematic structural diagram of a remote mapping device for computing resources, comprising:

a memory 301, for storing a computer program; and a processor 302, for executing the computer program to implement steps of the remote mapping method for computing resources in any one of the embodiments above.

It should be noted that in the present description, relational terms such as first and second, etc. are only used to distinguish one entity or operation from another entity or operation, and do not necessarily require or imply any actual relationship or sequence between these entities or operations. Furthermore, the terms "comprise", "comprising", or any other variations thereof are intended to cover a non-exclusive inclusion, so that a process, a method, an article, or a device that includes a series of elements not only includes those elements, but also includes other elements that are not explicitly listed, or further includes inherent elements of the process, the method, the article, or the device. Without further limitation, an element defined by a sentence "comprising a . . . " does not exclude other same elements existing in a process, a method, an article, or a device that includes the element.

A person skilled in the art may further appreciate that units and algorithm steps in examples described in combination with the embodiments disclosed herein can be achieved in the form of electronic hardware, computer software, or a combination of the two. To clearly describe the interchangeability between hardware and software, the content above has generally described compositions and steps of each example according to functions. Whether these functions are executed by hardware or software depends on specific applications and design constraint conditions of the technical solutions. A person skilled in the art may use different methods to implement the described functions for each particular application, but the implementation shall not be considered to go beyond the scope of some embodiments of the present disclosure. The principle and embodiments of the present disclosure are described herein through specific examples, and the description of the embodiments above is only used to help understand the technical solutions and core ideas of some embodiments of the present disclosure. It should be noted that for a person of ordinary skill in the art, several improvements and modifications can be made to some embodiments of the present disclosure without departing from the principle of some embodiments of the present disclosure. These improvements and modifications also fall within the scope of protection of the claims of the present disclosure.

What is claimed is:

1. A remote mapping method for computing resources, which is applied to a server and comprises:
    identifying each Field Programmable Gate Array (FPGA) heterogeneous accelerator card in an FPGA BOX; wherein the FPGA BOX comprises one or more FPGA heterogeneous accelerator cards, and each FPGA heterogeneous accelerator card is decoupled from a Central Processing Unit (CPU) and completes configuration of a Peripheral Component Interconnect Express (PCIE) interface of the FPGA heterogeneous accelerator card and mapping of a data transmission function to a network interface;
    by means of a network interface of each FPGA heterogeneous accelerator card in the FPGA BOX, establishing a network communication connection with each FPGA heterogeneous accelerator card, and establishing a network communication connection between FPGA heterogeneous accelerator cards;
    mapping each FPGA heterogeneous accelerator card to the server;
    establishing network transmission for the established network communication connections, and migrating a control flow and a data flow that are transmitted by a PCIE interface to the network transmission; and
    deploying a target application in the FPGA BOX by means of the established network transmission, and performing data exchange with the FPGA BOX by means of the established network transmission during running of the target application.

2. The remote mapping method for computing resources as claimed in claim 1, wherein identifying each FPGA heterogeneous accelerator card in the FPGA BOX comprises:
    on the basis of interaction between a resource management module and the server, acquiring allocated information of each FPGA heterogeneous accelerator card, and storing acquired information of each FPGA heterogeneous accelerator card in an encryption configuration file of the server; and
    querying and decrypting the encryption configuration file of the server, to complete identification of each FPGA heterogeneous accelerator card in the FPGA BOX.

3. The remote mapping method for computing resources as claimed in claim 1, wherein mapping each FPGA heterogeneous accelerator card to the server comprises:
    allocating a virtual ID to each FPGA heterogeneous accelerator card according to a physical ID of each identified FPGA heterogeneous accelerator card in the FPGA BOX;
    establishing a mapping relationship between physical IDs and corresponding virtual IDs, and locally creating a device node in the server according to the virtual ID; wherein each device node corresponds to an FPGA; and
    establishing a mapping relationship between virtual IDs of device nodes and corresponding network address information, to complete mapping of each FPGA heterogeneous accelerator card to the server.

4. The remote mapping method for computing resources as claimed in claim 1, wherein the method further comprises:
    performing PCIE bus simulation on the basis of a virtual device driver, converting a Base Address Register (BAR) address operation of virtual PCIE to Ethernet data packet operation, and completing register operations, DMA data flow operations and data reception interruption which are performed by an upper-layer application.

5. The remote mapping method for computing resources as claimed in claim 1, wherein the method further comprises:
    after completing calculation of the target application by using each FPGA heterogeneous accelerator card in the FPGA BOX, receiving a message representing that the calculation is completed; and
    sending a virtual interruption signal to the upper-layer application.

6. The remote mapping method for computing resources as claimed in claim 1, wherein the network interface of each FPGA heterogeneous accelerator card in the FPGA BOX is a network interface based on an optical module.

7. The remote mapping method for computing resources as claimed in claim 1, wherein establishing network transmission for the established network communication connections, and migrating the control flow and the data flow that are transmitted by the PCIE interface to the network transmission comprises:
    by means of a high-speed interconnection mechanism, establishing reliable network transmission for the established network communication connections, and migrating the control flow and the data flow that are transmitted by the PCIE interface to the reliable network transmission.

8. The remote mapping method for computing resources as claimed in claim 1, wherein the method further comprises:
    sending address restriction data carrying multiple pieces of network address information to each preset FPGA heterogeneous accelerator card, so that each FPGA heterogeneous accelerator card receiving the address restriction data only allows communication with a device of which network address information complies with definition of the address restriction data;
    wherein the address restriction data at least comprises network address information of the server.

9. The method as claimed in claim 1, wherein the PCIE interface is only used for power supply, a control path and a data path of each FPGA heterogeneous accelerator card in the FPGA BOX do not perform transmission via PCIE and CPU, but perform transmission directly on the basis of a network interface of the FPGA heterogeneous accelerator card.

10. The method as claimed in claim 1, wherein data exchanged between the server with the FPGA BOX comprises: control instruction type for modifying configuration of a register in the FPGA BOX.

11. The method as claimed in claim 1, wherein data exchanged between the server with the FPGA BOX comprises: data type comprise reading operation, writing operation, and interruption operation;
Wherein a writing operation of a register or Direct Memory Access (DMA) in an FPGA is implemented by the following steps: a virtual ID, corresponding to the FPGA heterogeneous accelerator card, of the current environment of the server is acquired first and then according to an IP address of the FPGA heterogeneous accelerator card, a protocol packaging operation is performed according to a development interface of the high-speed interconnection mechanism; and next, data is sent to a remote FPGA heterogeneous accelerator card by an optical module to complete the writing operation;
the reading operation is implemented by the following steps: the server detects an Ethernet receiving data packet, and performs UDP unpacking operation according to a high-speed interconnection mechanism protocol to complete data receiving;
the interruption operation is implemented by the following steps: the FPGA heterogeneous accelerator card actively sends a feature packet, and after parsing the packet as a feature packet, the server transmits the feature packet to an upper-layer OpenCL/RTL development framework by a signal mechanism.

12. The method as claimed in claim 1, wherein the server is simultaneously compatible with FPGA heterogeneous accelerator cards of the server locally.

13. A remote mapping device for computing resources, comprising:
a memory for storing a computer program; and
a processor for executing the computer program to cause the processor to:
identify each Field Programmable Gate Array (FPGA) heterogeneous accelerator card in an FPGA BOX; wherein the FPGA BOX comprises one or more FPGA heterogeneous accelerator cards, and each FPGA heterogeneous accelerator card is decoupled from a Central Processing Unit (CPU) and completes configuration of a Peripheral Component Interconnect Express (PCIE) interface of the FPGA heterogeneous accelerator card and mapping of a data transmission function to a network interface;
by means of a network interface of each FPGA heterogeneous accelerator card in the FPGA BOX, establish a network communication connection with each FPGA heterogeneous accelerator card, and establish a network communication connection between FPGA heterogeneous accelerator cards;
map each FPGA heterogeneous accelerator card to the server;
establish network transmission for the established network communication connections, and migrate a control flow and a data flow that are transmitted by a PCIE interface to the network transmission; and
deploy a target application in the FPGA BOX by means of the established network transmission, and perform data exchange with the FPGA BOX by means of the established network transmission during running of the target application.

14. The remote mapping device for computing resources as claimed in claim 13, wherein the processor is configured to:
on the basis of interaction between a resource management module and the server, acquire allocated information of each FPGA heterogeneous accelerator card, and store acquired information of each FPGA heterogeneous accelerator card in an encryption configuration file of the server; and
query and decrypt the encryption configuration file of the server, to complete identification of each FPGA heterogeneous accelerator card in the FPGA BOX.

15. The remote mapping device for computing resources as claimed in claim 13, wherein the processor is configured to:
allocate a virtual ID to each FPGA heterogeneous accelerator card according to a physical ID of each identified FPGA heterogeneous accelerator card in the FPGA BOX:
establish a mapping relationship between physical IDs and corresponding virtual IDs, and locally create a device node in the server according to the virtual ID; wherein each device node corresponds to an FPGA; and
establish a mapping relationship between virtual IDs of device nodes and corresponding network address information, to complete mapping of each FPGA heterogeneous accelerator card to the server.

16. The remote mapping device for computing resources as claimed in claim 13, wherein the processor is configured to:
perform PCIE bus simulation on the basis of a virtual device driver, converting a Base Address Register (BAR) address operation of virtual PCIE to Ethernet data packet operation, and complete register operations, DMA data flow operations and data reception interruption which are performed by an upper-layer application.

17. The remote mapping device for computing resources as claimed in claim 13, wherein, the processor is configured to:
after completing calculation of the target application by using each FPGA heterogeneous accelerator card in the FPGA BOX, receive a message representing that the calculation is completed; and
send a virtual interruption signal to the upper-layer application.

18. The remote mapping device for computing resources as claimed in claim 13, wherein the network interface of each FPGA heterogeneous accelerator card in the FPGA BOX is a network interface based on an optical module.

19. The remote mapping method for computing resources as claimed in claim 13, wherein the processor is configured to:
by means of a high-speed interconnection mechanism, establish reliable network transmission for the established network communication connections, and migrate the control flow and the data flow that are transmitted by the PCIE interface to the reliable network transmission.

20. A Non-transitory storage medium, wherein the non-transitory storage medium stores a computer program, and when the computer program is executed by a processor to cause the processor to:

identify each Field Programmable Gate Array (FPGA) heterogeneous accelerator card in an FPGA BOX; wherein the FPGA BOX comprises one or more FPGA heterogeneous accelerator cards, and each FPGA heterogeneous accelerator card is decoupled from a Central Processing Unit (CPU) and completes configuration of a Peripheral Component Interconnect Express (PCIE) interface of the FPGA heterogeneous accelerator card and mapping of a data transmission function to a network interface;

by means of a network interface of each FPGA heterogeneous accelerator card in the FPGA BOX, establish a network communication connection with each FPGA heterogeneous accelerator card, and establish a network communication connection between FPGA heterogeneous accelerator cards;

map each FPGA heterogeneous accelerator card to the server;

establish network transmission for the established network communication connections, and migrate a control flow and a data flow that are transmitted by a PCIE interface to the network transmission; and deploy a target application in the FPGA BOX by means of the established network transmission, and perform data exchange with the FPGA BOX by means of the established network transmission during running of the target application.

\* \* \* \* \*